(12) United States Patent
Yamasaki et al.

(10) Patent No.: US 12,430,873 B2
(45) Date of Patent: Sep. 30, 2025

(54) IMAGING APPARATUS

(71) Applicant: Panasonic Intellectual Property Management Co., Ltd., Osaka (JP)

(72) Inventors: Takaaki Yamasaki, Osaka (JP); Shinichi Yamamoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 371 days.

(21) Appl. No.: 18/110,091

(22) Filed: Feb. 15, 2023

(65) Prior Publication Data

US 2023/0394787 A1 Dec. 7, 2023

(30) Foreign Application Priority Data

Jun. 6, 2022 (JP) ................ 2022-091770

(51) Int. Cl.
| | | |
|---|---|---|
| *G06V 10/56* | (2022.01) | |
| *G06F 3/14* | (2006.01) | |
| *G06T 7/90* | (2017.01) | |
| *G06V 10/141* | (2022.01) | |
| *G06V 10/25* | (2022.01) | |

(52) U.S. Cl.
CPC ............... *G06V 10/56* (2022.01); *G06F 3/14* (2013.01); *G06T 7/90* (2017.01); *G06V 10/141* (2022.01); *G06V 10/25* (2022.01); *G06T 2207/10024* (2013.01); *G06T 2207/10152* (2013.01)

(58) Field of Classification Search
CPC ...... G06V 10/56; G06V 10/141; G06V 10/25; G06V 10/14; G06F 3/14; G06T 7/90; G06T 2207/10024; G06T 2207/10152; G09G 2354/00; G09G 3/36; G09G 2320/0666

USPC .......................................... 382/162
See application file for complete search history.

(56) References Cited

U.S. PATENT DOCUMENTS

| | | |
|---|---|---|
| 5,642,214 A | 6/1997 | Ishii et al. |
| 6,337,706 B1 * | 1/2002 | Fujita ................. B41J 2/46 347/136 |
| 2014/0226903 A1 * | 8/2014 | Kimura ............. H04N 1/6027 382/173 |

(Continued)

FOREIGN PATENT DOCUMENTS

| | | |
|---|---|---|
| JP | H05-027253 A | 2/1993 |
| JP | H09-113868 A | 5/1997 |

(Continued)

*Primary Examiner* — Ali Bayat
(74) *Attorney, Agent, or Firm* — Renner, Otto, Boisselle & Sklar, LLP

(57) ABSTRACT

An imaging apparatus includes: an image sensor that captures a subject image by receiving light of a plurality of colors, to generate image data; a controller that controls the image sensor; and an adjuster that adjusts a light reception rate, in each position on an incident surface, the light reception rate allowing the image sensor to receive the light color by color, the incident surface being entered by the light corresponding to an image represented by the image data. The controller controls the adjuster to render the light reception rate of a specific first color in a position corresponding to part of the image on the incident surface different from the light reception rate of a first color in other positions, and causes the image sensor to capture the image with the light reception rate of the first color rendered different by the adjuster, generating image data representing the image.

7 Claims, 12 Drawing Sheets

(56) References Cited

U.S. PATENT DOCUMENTS

| | | | |
|---|---|---|---|
| 2015/0163391 A1* | 6/2015 | Osawa | G06V 10/141 |
| | | | 348/222.1 |
| 2018/0183984 A1* | 6/2018 | Fukuda | H10F 39/802 |
| 2019/0098224 A1 | 3/2019 | Kobayashi et al. | |
| 2020/0162662 A1* | 5/2020 | Tsuchiya | H04N 23/72 |

FOREIGN PATENT DOCUMENTS

| | | |
|---|---|---|
| JP | H10-290322 A | 10/1998 |
| JP | 2000-267127 A | 9/2000 |
| JP | 2008-219346 A | 9/2008 |
| JP | 2018-160935 A | 10/2018 |
| JP | 2019-040008 A | 3/2019 |
| JP | 2019-068402 A | 4/2019 |

* cited by examiner

Fig. 3B ADJUST ELECTRONIC COLOR FILTER

IMAGING APPARATUS

BACKGROUND

1. Technical Field

The present disclosure relates to an imaging apparatus capable of adjusting, color by color, a ratio with which light for capturing a subject image is received.

2. Related Art

JP 2008-219346 A discloses an imaging element capable of adjusting optical sensitivity for each color. The imaging element includes a plurality of photoelectric conversion units that are formed on a semiconductor substrate and that generate signal charge by receiving incident light, and a color filter layer arranged on each of the plurality of photoelectric conversion units so as to correspond to a predetermined color. Furthermore, the imaging element includes a condenser lens unit that is formed on the color filter layer and that has a liquid-crystal layer whose alignment changes upon application of a voltage, and a liquid-crystal voltage adjuster that applies a voltage to the liquid-crystal layer located on a color filter layer of a predetermined color.

SUMMARY

The present disclosure provides an imaging apparatus that enables colors in an image to be easily adjusted.

An imaging apparatus according to the present disclosure includes: an image sensor that captures a subject image by receiving light of a plurality of colors, to generate image data; a controller that controls the image sensor; and an adjuster that adjusts a light reception rate, in each position on an incident surface, the light reception rate allowing the image sensor to receive the light color by color, the incident surface being entered by the light corresponding to an image represented by the image data, wherein the controller controls the adjuster to render the light reception rate of a specific first color in a position corresponding to part of the image on the incident surface different from the light reception rate of a first color in other positions, and causes the image sensor to capture the image with the light reception rate of the first color being rendered different by the adjuster, thus generating image data representing the image.

The imaging apparatus of the present disclosure enables colors of an image to be easily adjusted.

BRIEF DESCRIPTION OF DRAWINGS

FIGS. 3A and 3B are diagrams to provide an outline of an operation of the digital camera according to the first embodiment;

DETAILED DESCRIPTION

An embodiment will be described in detail hereinbelow with reference to the drawings as appropriate. However, a detailed description exceeding requirements may be omitted. It should be noted that the accompanying drawings and the following description are provided for a person skilled in the art to fully understand the present disclosure. Thus, the drawings and the description are not intended to limit the subject matter defined in the patent claims.

First Embodiment

In a first embodiment, a digital camera, which serves as an example of the imaging apparatus according to the present disclosure, will be described.

1. Configuration

A configuration of a digital camera according to the first embodiment will be described using FIGS. 1 and 2.

Figure 1:
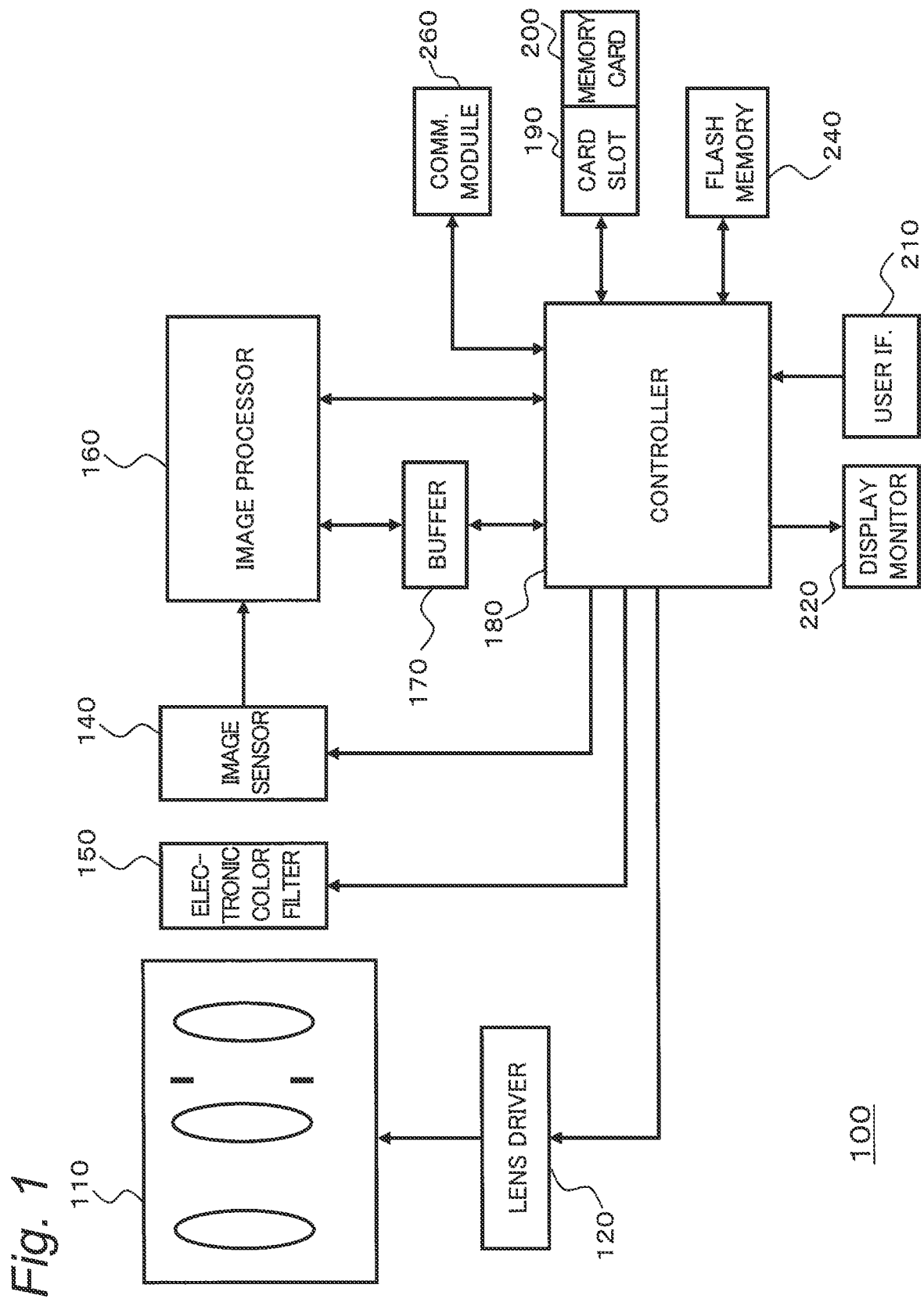
FIG. 1 is a diagram showing a configuration of a digital camera according to a first embodiment of the present disclosure.

FIG. 1 is a diagram showing a configuration of a digital camera 100 according to the present embodiment. The digital camera 100 according to the present embodiment includes an optical system 110, a lens driver 120, an image sensor 140, and an electronic color filter 150. The digital camera 100 further includes an image processor 160, a buffer memory 170, a controller 180, a user interface 210, and a display monitor 220. The digital camera 100 also includes a flash memory 240, a card slot 190, and a communication module 260.

The optical system 110 includes a zoom lens, a focus lens, a diaphragm, and the like. The zoom lens is a lens for changing the magnification of the subject image formed by the optical system. The focus lens is a lens for changing the focus state of the subject image formed on the image sensor 140. The zoom lens and the focus lens are formed of one or more lenses.

The lens driver 120 includes a configuration for driving various lenses of the optical system 110 such as a focus lens. For example, the lens driver 120 includes a motor and moves the focus lens along the optical axis of the optical system 110, based on control by the controller 180. The configuration for driving the focus lens in the lens driver 120 can be implemented by a DC motor, a stepping motor, a servo motor, an ultrasonic motor, or the like.

The image sensor 140 captures a subject image incident through the optical system 110 and generates image data. The image data generated by the image sensor 140 is inputted to the image processor 160.

The image sensor 140 generates image data of a new frame at a predetermined frame rate (for example, 30 frames/second). The imaging data generation timing and electronic shutter operation of the image sensor 140 are controlled by the controller 180. As the image sensor 140, various image sensors such as a CMOS image sensor, a CCD image sensor, or an NMOS image sensor can be used.

The image sensor 140 includes, for example, an optical color filter layer provided for each RGB (red, green, and blue) pixel in a Bayer array or the like, and a photoelectric conversion unit that configures each pixel to receive light incident through the color filter layer and generate an electric signal. The image sensor 140 executes an imaging operation of a moving image or a still image, an imaging operation of a through image, and the like. The through image is mainly a moving image, and is displayed on the display monitor 220 for the user to determine the composition. The image sensor 140 is an example of the image sensor according to the present embodiment.

The electronic color filter 150 is a filter element that enables the ratio with which light such as visible light is transmitted and received by the photoelectric conversion unit of the image sensor 140 to be changed through electronic control for each RGB color or other such color. The electronic color filter 150 is configured to be integral with the image sensor 140 by being provided on a color filter layer of the image sensor 140, for example (see JP 2008-219346 A). The electronic color filter 150 according to the present embodiment is configured to be capable of changing the light reception rate of each RGB color, in each position of a predetermined unit on the incident surface whereon the light is incident. A configuration example of the electronic color filter 150 according to the present embodiment is illustrated in FIG. 2.

Figure 2:
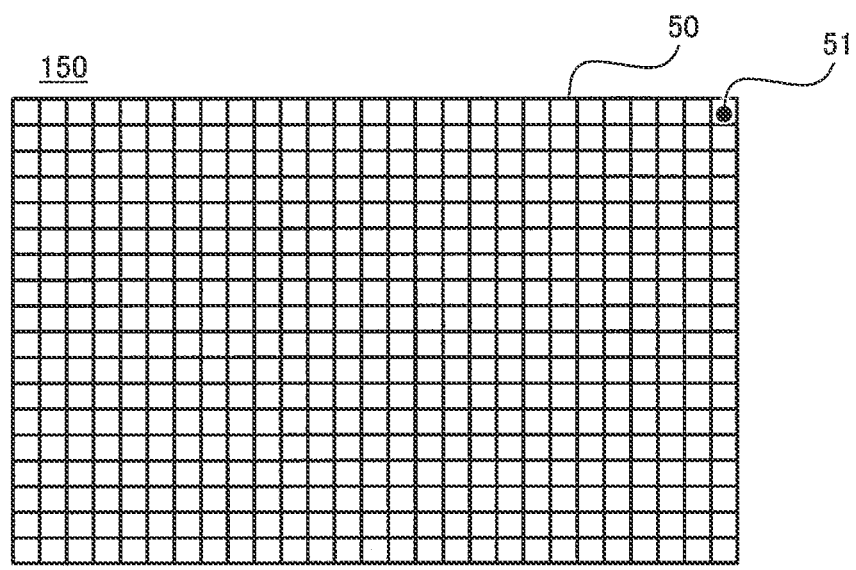
FIG. 2 is a diagram illustrating a configuration of an electronic color filter in the digital camera according to the first embodiment.

As shown in FIG. 2, for example, the electronic color filter 150 according to the present embodiment has an incident surface 50 whereon a plurality of pixels 51 is arranged in a two-dimensional array. The electronic color filter 150 is aligned with respect to the image sensor 140 such that each pixel 51 of the electronic color filter 150 on the incident surface 50 corresponds to each of the RGB pixels on the imaging surface of the image sensor 140, via incident light from the optical system 110.

The electronic color filter 150 is configured by, for example, sealing a liquid-crystal element in a lens unit or a transparent layer that guides light to the image sensor 140 for each pixel 51. The electronic color filter 150 is capable of independently adjusting the light reception rate of incident light for each region (in each position) on the incident surface 50 in units of pixels 51 as region units. The electronic color filter 150 may be configured to adjust the transmittance of light with respect to the pixels of each color as the light reception rate for each pixel of each color in the liquid crystal layer.

On the incident surface 50 of the electronic color filter 150, a transparent electrode (not illustrated) corresponding to each region is arranged on a glass substrate so that the light reception rate can be independently controlled for each region, and a drive circuit (not illustrated) is capable of independently adjusting the transmittance of each of the plurality of pixels 51 by setting a drive voltage for each region. The electronic color filter 150 is an example of an adjuster that adjusts the light reception rate for each color (also referred to hereinbelow as the "color density"). For example, as per JP 2008-219346 A, a configuration in which the optical sensitivity of a desired color is enhanced by controlling the voltage of the lens unit on each pixel, color by color, to condense the light on the photoelectric conversion units and increasing the amount of light received, color by color, may be adopted for the electronic color filter 150. As a result, for example, it is possible to realize adjustment such as increasing the color density of blue in order to change a cloudy sky to bright blue on the captured image.

Returning to FIG. 1, the image processor 160 performs predetermined processing on the image signal outputted from the image sensor 140 to generate image data, or performs various processing on the image data to generate an image to be displayed on the display monitor 220. The predetermined processing includes white balance correction, gamma correction, YC conversion processing, electronic zoom processing, compression processing, expansion processing, and the like, but is not limited to such processing. The image processor 160 may include a hard-wired electronic circuit, or may include a microcomputer, a processor, or the like, which uses a program.

The buffer memory 170 is a recording medium that functions as a work memory for the image processor 160 and the controller 180. The buffer memory 170 is implemented with a dynamic random-access memory (DRAM) or the like. The flash memory 240 is a non-volatile recording medium. Each of the memories 170 and 240 is an example of a storage unit according to the present embodiment.

The controller 180 controls the overall operation of the digital camera 100. The controller 180 uses the buffer memory 170 as a work memory during a control operation and an image processing operation.

The controller 180 includes a CPU or an MPU, and the CPU or MPU achieves a predetermined function by executing a program (software). The controller 180 may include a processor including a dedicated electronic circuit designed to achieve a predetermined function instead of the CPU or the like. That is, the controller 180 can be implemented with various processors such as a CPU, an MPU, a GPU, a DSU, an FPGA, and an ASIC. The controller 180 may include one or more processors.

The card slot 190 enables the memory card 200 to be installed, and accesses the memory card 200 based on the control by the controller 180. The digital camera 100 is capable of recording image data on the memory card 200 and of reading the recorded image data from the memory card 200.

The user interface 210 is a generic term for operation members that receive an operation (instruction) from a user. The user interface 210 includes buttons, levers, dials, touch panels, joysticks, switches, and the like that receive user operations, and includes, for example, direction keys, an enter button, a shutter button, a moving image recording button, a function button, and the like. Furthermore, the user interface 210 may also include a virtual button or an icon displayed on the display monitor 220, or the like.

The display monitor 220 is an example of a display unit that displays various types of information. For example, the display monitor 220 displays an image (a through image) represented by image data captured by the image sensor 140 and subjected to image processing by the image processor 160. Further, the display monitor 220 displays a menu screen or the like for the user to perform various settings on the digital camera 100. The display monitor 220 can include, for example, a liquid-crystal display device or an organic EL device.

The communication module 260 is a module (circuit) that performs communication conforming to the communication standard IEEE 802.11 or a Wi-Fi standard, or the like. The digital camera 100 may communicate directly with other devices via the communication module 260 or may communicate via an access point. The communication module 260 may be connectable to a communication network such as the Internet.

2. Operation

The operation of the digital camera 100 configured as described above will be described hereinbelow. The digital camera 100 according to the present embodiment has a function for shooting an image partially adjusted in color by the electronic color filter 150. An outline of the operation of the digital camera 100 will be described hereinbelow.

2-1. Outline of Operation

Figure 3A:
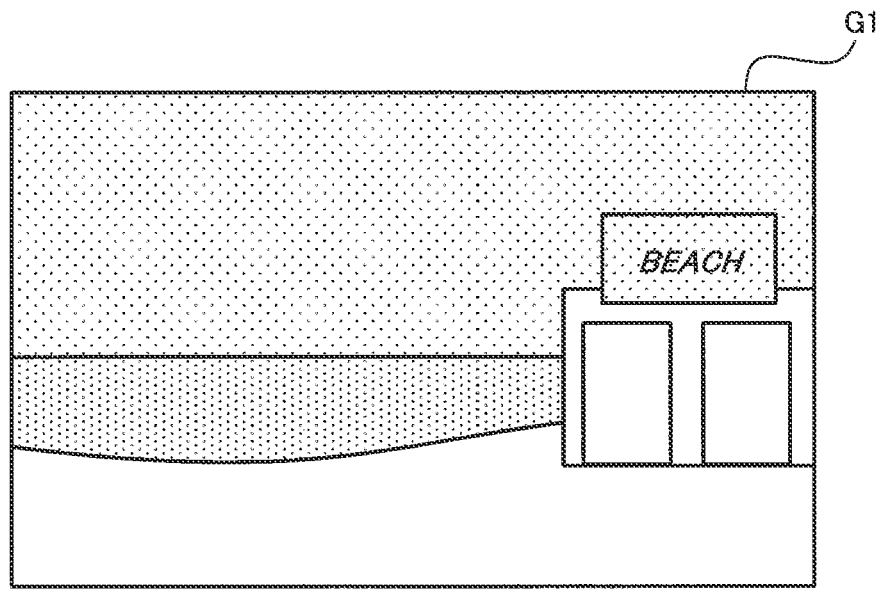
Figure 3A:
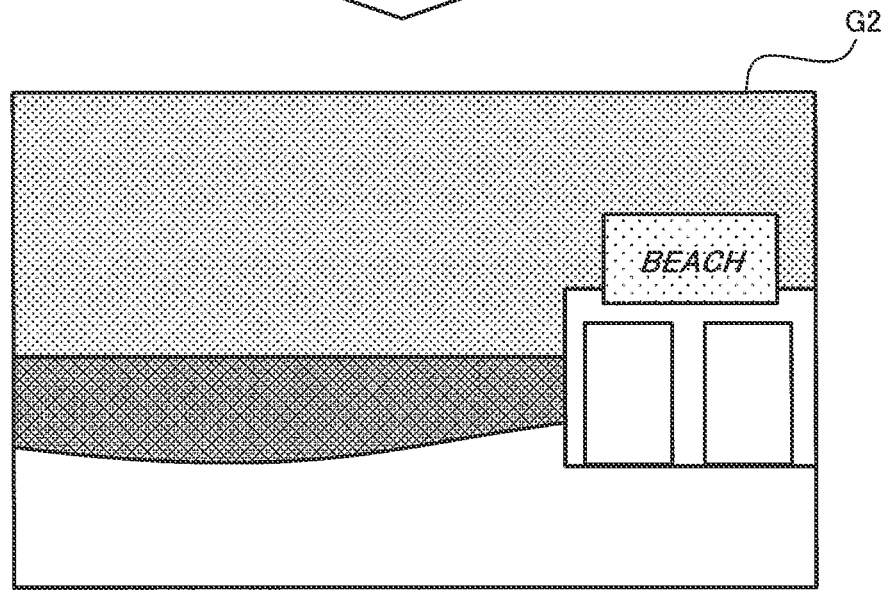

FIGS. 3A and 3B are diagrams to provide an outline of the operation of the digital camera 100 according to the present embodiment.

FIG. 3A illustrates a through image G1 as an example of a shooting scene with insufficient saturation. FIG. 3B illustrates a recorded image G2 of a shooting result of the shooting scene of FIG. 3A by the digital camera 100 according to the present embodiment.

The shooting scene illustrated in FIG. 3A includes the sky and the sea having a lower blue chroma than when the weather is good and so forth, white sand beaches, and a building having a blue signboard and a white outer wall. In such a case, for example, it is conceivable that the user desires to capture an image in a high-chroma color tone in which the color tones of the sky and the sea are similar to those in good weather.

As a conventional countermeasure in such a shooting scene, it is conceivable to use an optical color filter in which a blue transparent portion and a colorless transparent portion are provided by performing region division in advance, in an optical filter member, for example. However, in such an optical color filter, for example, in the example of FIG. 3A, it is difficult to match a blue transparent portion only to both the sky and the sea, and a part of a building appears in an unnatural blue color. Alternatively, a method of highlighting blue, or the like, of a partial image region in image processing after shooting is conceivable, but in such post-processing, for example, it is difficult to eliminate the occurrence of blown-out highlights at the time of shooting.

Therefore, the digital camera 100 according to the present embodiment controls, region by region, the degree to which a specific color is highlighted (that is, the color density) by the electronic color filter 150. As a result, the digital camera 100 according to the present embodiment enables an image of the color tone desired by the user across the entire image as shown in FIG. 3B, even in a captured scene like that of FIG. 3A, for example. A specific color whose color density is adjusted by the electronic color filter 150 is referred to hereinbelow as a "filter color".

For instance, in the example of FIG. 3A, the digital camera 100 according to the present embodiment adjusts, so as to selectively increase, the color density of blue as the filter color in the portion corresponding to the sky and the sea in the electronic color filter 150. As a result, for example, as shown in FIGS. 3A and 3B, it is possible to shoot the recorded image G2 in which the color tones of the sky and the sea are set to high chroma while maintaining the color tone of the building. Furthermore, at the time of such image shooting, the exposure setting can be separately adjusted after the color adjustment is performed in the digital camera 100 as described above. Therefore, it is possible to easily shoot an image utilizing the dynamic range of the digital camera 100, for example, to easily eliminate blown-out highlights and the like. Details of the operation of the digital camera 100 according to the present embodiment will be described hereinbelow.

2-2. Overall Operation

The overall operation when an image is shot using the electronic color filter 150 as described above in the digital camera 100 according to the present embodiment will be described using FIGS. 4 and 5.

Figure 4:
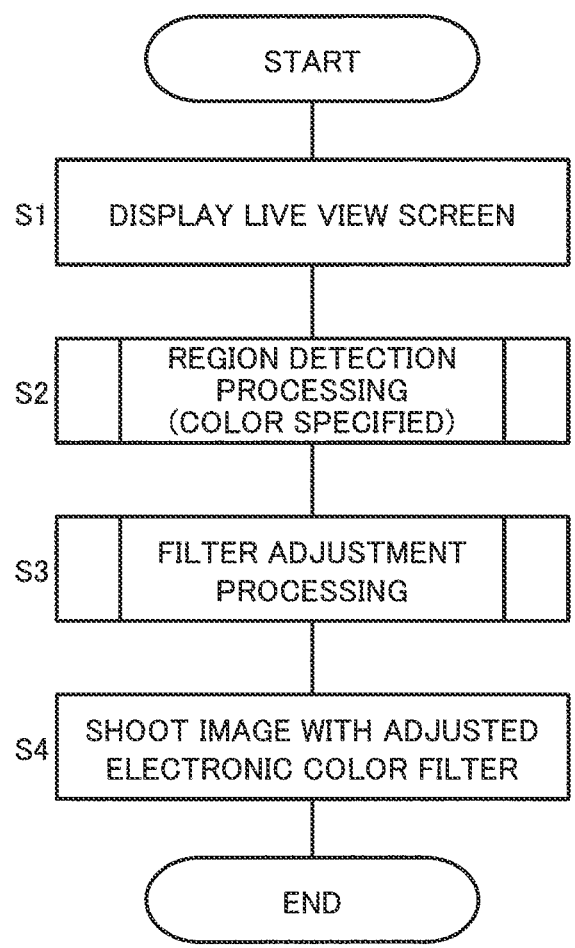
FIG. 4 is a flowchart illustrating the operation of the digital camera according to the first embodiment.
Figure 5A:
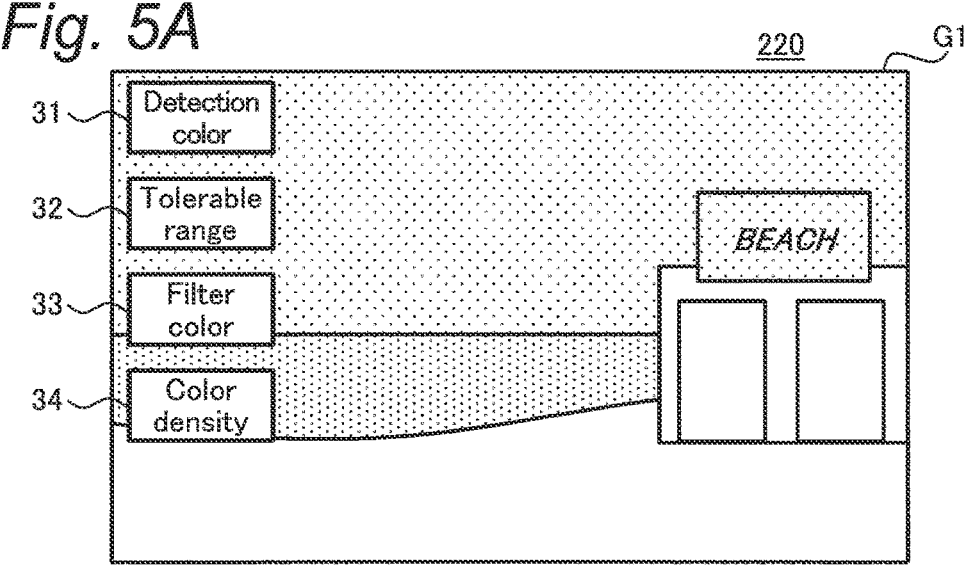
FIGS. 5A to 5C are diagrams to describe the operation of the digital camera according to the first embodiment.
Figure 5B:
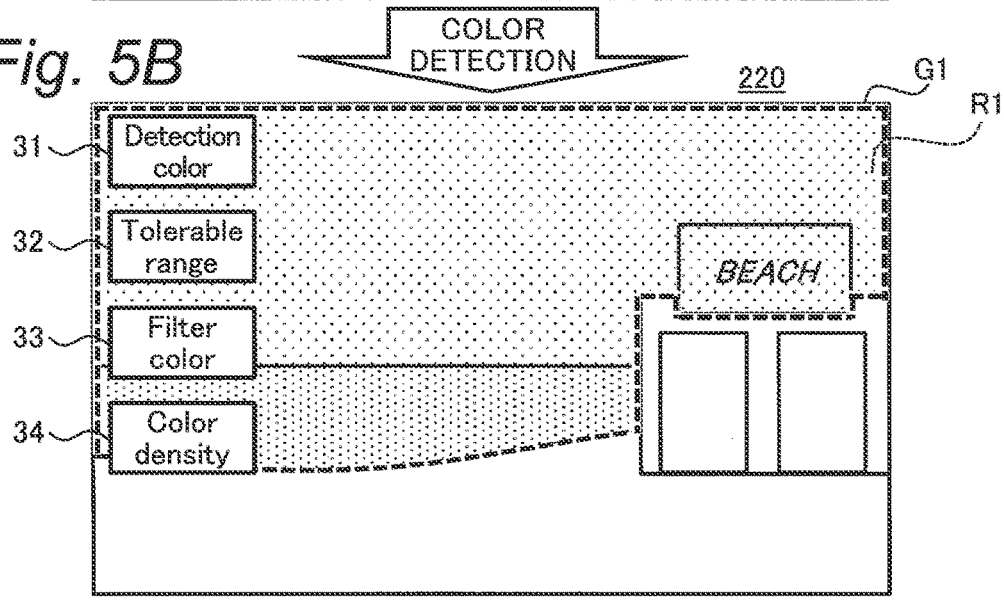
Figure 5C:
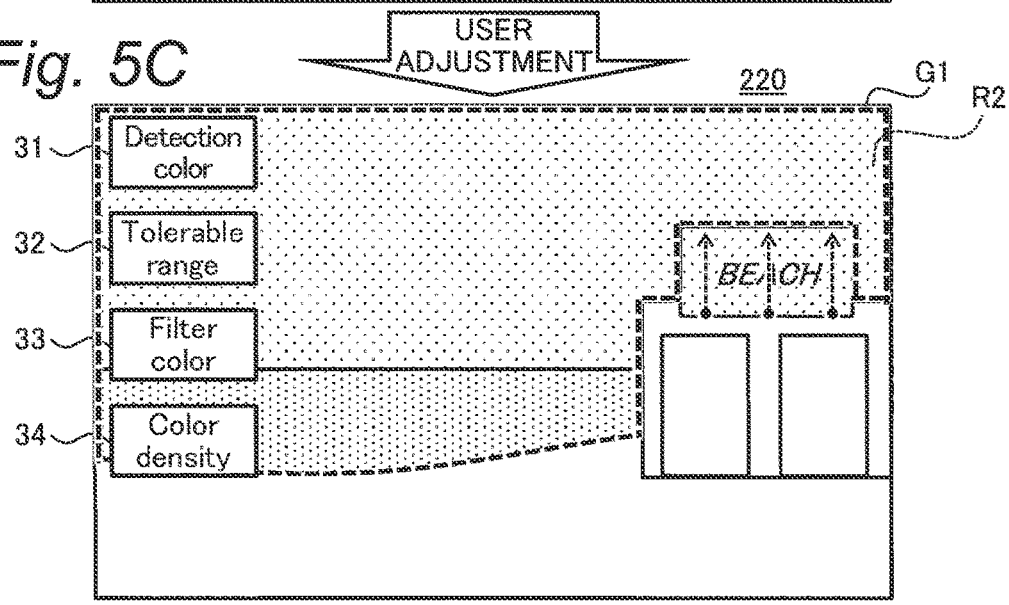

FIG. 4 is a flowchart illustrating the operation of the digital camera 100 according to the present embodiment. FIGS. 5A to 5C are diagrams to describe the operation of the digital camera 100 according to the present embodiment. The processing shown in the flowchart of FIG. 4 is started, for example, in a state where the digital camera 100 is set to the shooting mode that uses the electronic color filter 150, and is executed by the controller 180 of the digital camera 100.

First, the controller 180 displays a live view screen on the display monitor 220, for example (S1). The display example in step S1 is shown in FIG. 5A.

FIG. 5A illustrates a live view screen in an initial state (S1) in the examples of FIGS. 3A and 3B. The controller 180 displays, on the live view screen (S1), the through image G1 illustrated in FIG. 3A and icons 31 to 34 (described subsequently) for various operations in the main shooting mode. The live view screen is an example of an operation screen for receiving a user operation by displaying the through image G1 in real time. In step S1, in the electronic color filter 150, for example, the color density of each color is set to a common initial value (for example, 50%) overall.

Next, the controller 180 detects a region assumed to be a target of color adjustment using the electronic color filter 150 based on, for example, the through image G1 (S2). The display example in step S2 is illustrated in FIG. 5B.

FIG. 5B illustrates a state in which the detection results of step S2 are displayed on the live view screen of FIG. 5A. In the region detection processing (S2) according to the present embodiment, for example, in the through image G1, a color region R1 which is a region having a color (that is, a detection color) designated by the user as an adjustment target is detected. For example, in the examples of FIGS. 3A and 3B, in response to the designation to set blue as the detection color, the controller 180 detects a color region R1 including the sky and the sea on the through image G1 as shown in FIG. 5B (S2). Details of such region detection processing (S2) will be described subsequently.

Next, the controller 180 receives an operation for performing fine-adjustment desired by the user from the color region R1 detected as described above, for example, and performs processing to execute control of the electronic color filter 150, that is, filter adjustment processing (S3). The display example in step S3 is illustrated in FIG. 5C.

FIG. 5C illustrates a state after the user fine-adjustment in step S3 is performed, after the display screen of FIG. 5B. Because the color region R1 in the example of FIG. 5B is a detection result (S2) by designating blue, the color region R1 includes a portion that the user does not particularly desire to adjust (that is, a signboard of a building) in addition to the portions for which the user desires adjustment of the color density (that is, the sky and the sea).

Therefore, in the filter adjustment processing (S3) according to the present embodiment, a user operation is received that enables setting of an adjustment region R2, which is a region for adjusting the color density of the electronic color filter 150, through fine-adjustment from the color region R1. For example, as shown in FIGS. 5B and 5C, the user is able to change the adjustment region R2 so as to remove the portion of the signboard from the color region R1. Details of the filter adjustment processing (S3) will be described subsequently.

The controller 180 executes the image shooting operation by the digital camera 100 in a state where the electronic color filter 150 is adjusted in the filter adjustment processing (S3) as described above (S4). For example, in still image shooting, when detecting a user operation such as pressing of a shutter button in the user interface 210, the controller 180 causes the image sensor 140 to execute a still image capturing operation, and records the generated image data in the memory card 200 via the card slot 190. In step S8, a plurality of still images may be shot, or continuous shooting may be performed. Further, step S4 is not limited to still image shooting in particular, and may be moving image shooting.

According to the overall operation described above, the digital camera 100 according to the present embodiment detects the color region R1 of the detection color designated by the user in the through image G1 (S2), and receives a user operation or the like for fine-adjustment from the color region R1 (S3). As a result, the color density of the filter color in the electronic color filter 150 can be selectively adjusted in the adjustment region R2 desired by the user to perform image shooting (S3, S4). In this way, for example, as shown in FIG. 3B, a recorded image G2 in which the blue color of the sky and the sea are naturally highlighted can be easily shot.

2-2-1. Region Detection Processing

The region detection processing in step S2 of FIG. 4 will be described using FIGS. 6 and 7.

Figure 6:
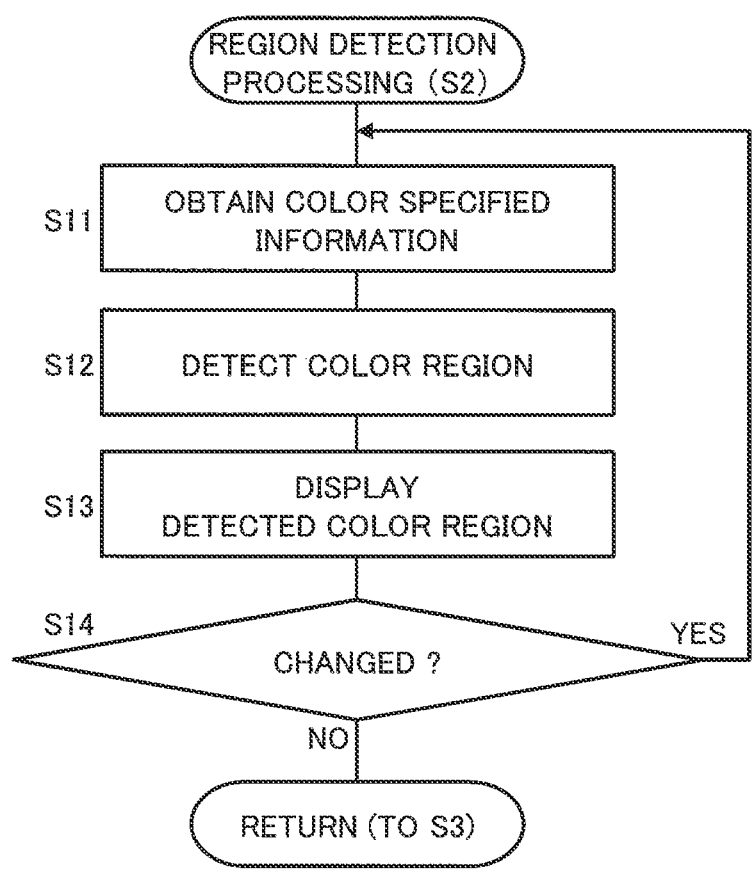
FIG. 6 is a flowchart illustrating region detection processing according to the first embodiment.
Figure 7A:
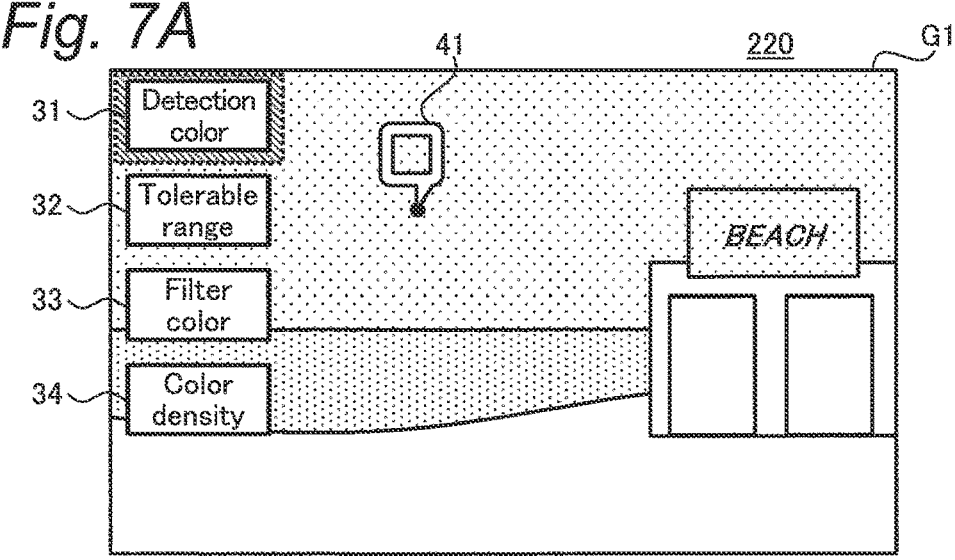
FIGS. 7A to 7C are diagrams to describe region detection processing according to the first embodiment.
Figure 7B:
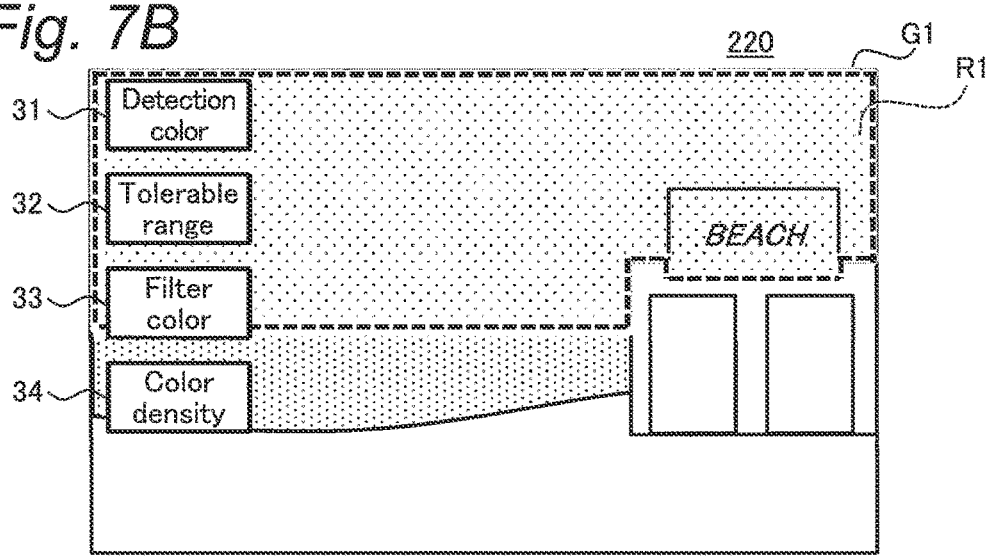
Figure 7C:
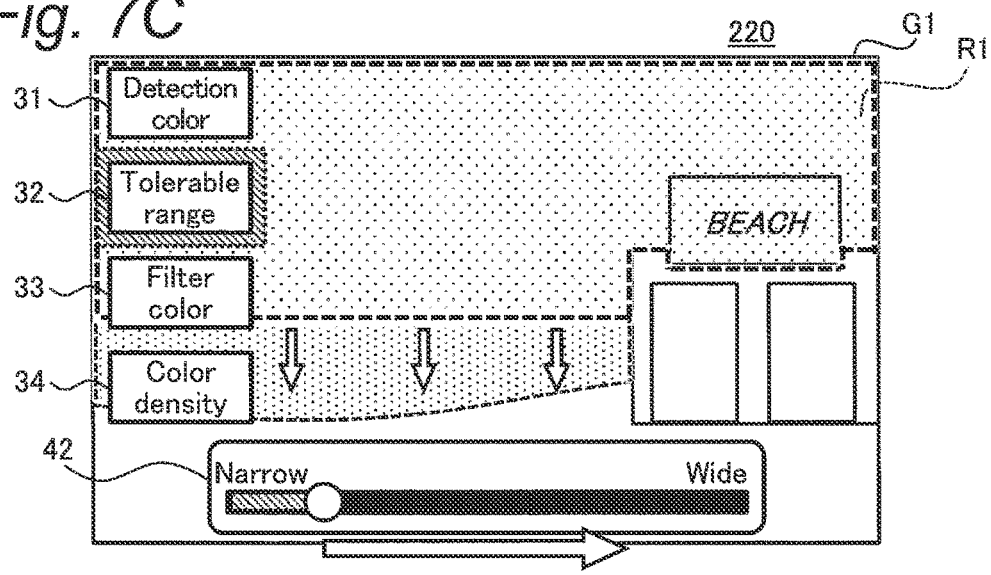

FIG. 6 is a flowchart illustrating the region detection processing (S2) of the digital camera 100 according to the present embodiment. FIGS. 7A to 7C are diagrams to describe the region detection processing (S2).

First, the controller 180 acquires color designation information indicating the detection color which the user desires to be detected by the digital camera 100, in response to a user operation of the user interface 210, for example (S11). The display example in step S11 is illustrated in FIG. 7A.

FIG. 7A illustrates, for example, a state in which the detection color icon 31 allowing inputting of an operation for designating the detection color (S11) on the live view screen of FIG. 5A has been enabled. The controller 180 according to the present embodiment receives, in the user interface 210, a user operation for designating a position in the through image G1 as a detection-color designation operation, and acquires color designation information by extracting, as a detection color, the color values of the designated position in the through image G1 (S11).

In FIG. 7A, for example, a detection color marker 41 is displayed as the input result of the detection-color designation operation. The user is able to input the designation operation so as to arrange the detection color marker 41 on the through image G1 by using, for example, a touch panel or a joystick of the user interface 210. The detection color marker 41 is, for example, arranged in the position designated by the designation operation on the through image G1, and indicates the color values of the arrangement position as the detection color. The color designation information acquired in this manner includes the color values (for example, three RGB values) of the detection color and an allowable range to be detected using the color values as a reference. In step S11, the allowable range for the color designation information is set to a relatively narrow initial value, for example.

Next, based on the acquired color designation information, for example, the controller 180 detects in the through image G1, as the color region R1, a region having a color value included in the detection color indicated by the color designation information and the allowable range thereof (S12). The controller 180 causes the display monitor 220 to display the color region R1 detected on the live view screen (S13). The display example in step S13 is shown in FIG. 7B.

FIG. 7B illustrates a detection result of the color region R1 from the display screen of FIG. 7A. In the example of FIG. 7B, the controller 180 detects the color region R1 including an empty portion on the through image G1, based on the detection color indicated by the detection color marker 41 of the example of FIG. 7A and a relatively narrow allowable range (see FIG. 7C) (S12).

In step S13, as illustrated in FIG. 7B, the display monitor 220 displays the detected color region R1 on the through image G1 by using a highlighted display such as circling with a predetermined line type. For example, the controller 180 controls the image processor 160 so as to perform image processing to highlight the color region R1 in the through image G1, and causes the display monitor 220 to outputs the processing results (S13). The highlighted display of the color region R1 is not particularly limited to the foregoing, and for example, a pattern such as a zebra pattern may be displayed inside the color region R1, or the color tone inside the color region R1 may be changed.

The controller 180 receives various user operations in the user interface 210 in a state where the color region R1 detected as described above is displayed on the live view screen, for example (S14). The display example in step S14 is shown in FIG. 7C.

FIG. 7C illustrates a state in which an allowable range icon 32 allowing inputting of a user operation for changing the allowable range of the detection color is enabled from the display screen of FIG. 7B. In the example of FIG. 7C, the controller 180 causes the display monitor 220 to display a setting bar 42 for the allowable range, and, through a touch operation or the like on the setting bar 42, receives a change operation to widen or narrow the allowable range being set.

When the allowable range change operation is inputted (YES in S14), the controller 180 again performs the processing of step S11 and subsequent steps so as to reflect, in the color designation information, the allowable range of the detection color changed by the inputted user operation. For example, when a change operation to widen the allowable range of the detection color is performed from the state of FIG. 7C (YES in S14), the controller 180 detects the color region R1 in a wide allowable range from the detection color including the sky and the sea on the through image G1, as illustrated in FIG. 5B (S12).

For example, when another user operation that is not an allowable-range change operation is inputted (NO in S14), the controller 180 stores, for example, the last detected color region R1 in the buffer memory 170 as a detection result, and ends the region detection processing (S2). Thereafter, the controller 180 proceeds to step S3 in FIG. 4.

According to the region detection processing (S2), for example, the digital camera 100 detects the color region R1 corresponding to the detection color designated by the user on the through image G1 (S12), and makes the detection result visible to the user (S13). After confirming the detection result, the user is able to adjust the designated allowable range for the detection color (S14). As a result, from the viewpoint of region detection of similar colors, the digital camera 100 can easily be made to detect a region, on the through image G1, for which the user desires a color tone adjustment.

In step S11 above, the designation of the detection color is not necessarily the designation of a position on the through image G1. For example, the controller 180 of the digital camera 100 may receive a user operation for selecting the detection color from among a plurality of candidate colors prepared in advance in step S11.

In step S14 above, not only an operation for changing the allowable range, but also a user operation for changing the detection color may be inputted. In this case, for example, the controller 180 again performs the processing of step S1*l* and subsequent steps so as to use the changed detection color and the previous allowable range as the color designation information.

Further, the color designation information such as the detected color and the allowable range thereof is not particularly limited to the three values of RGB, and can be defined by various parameters, and may be set by, for example, hue, saturation, and brightness. Furthermore, the allowable range of the color designation information may be set separately for each of various parameters.

2-2-2. Filter Adjustment Processing

The filter adjustment processing in step S3 of FIG. 4 will be described using FIGS. 8 and 9.

Figure 8:
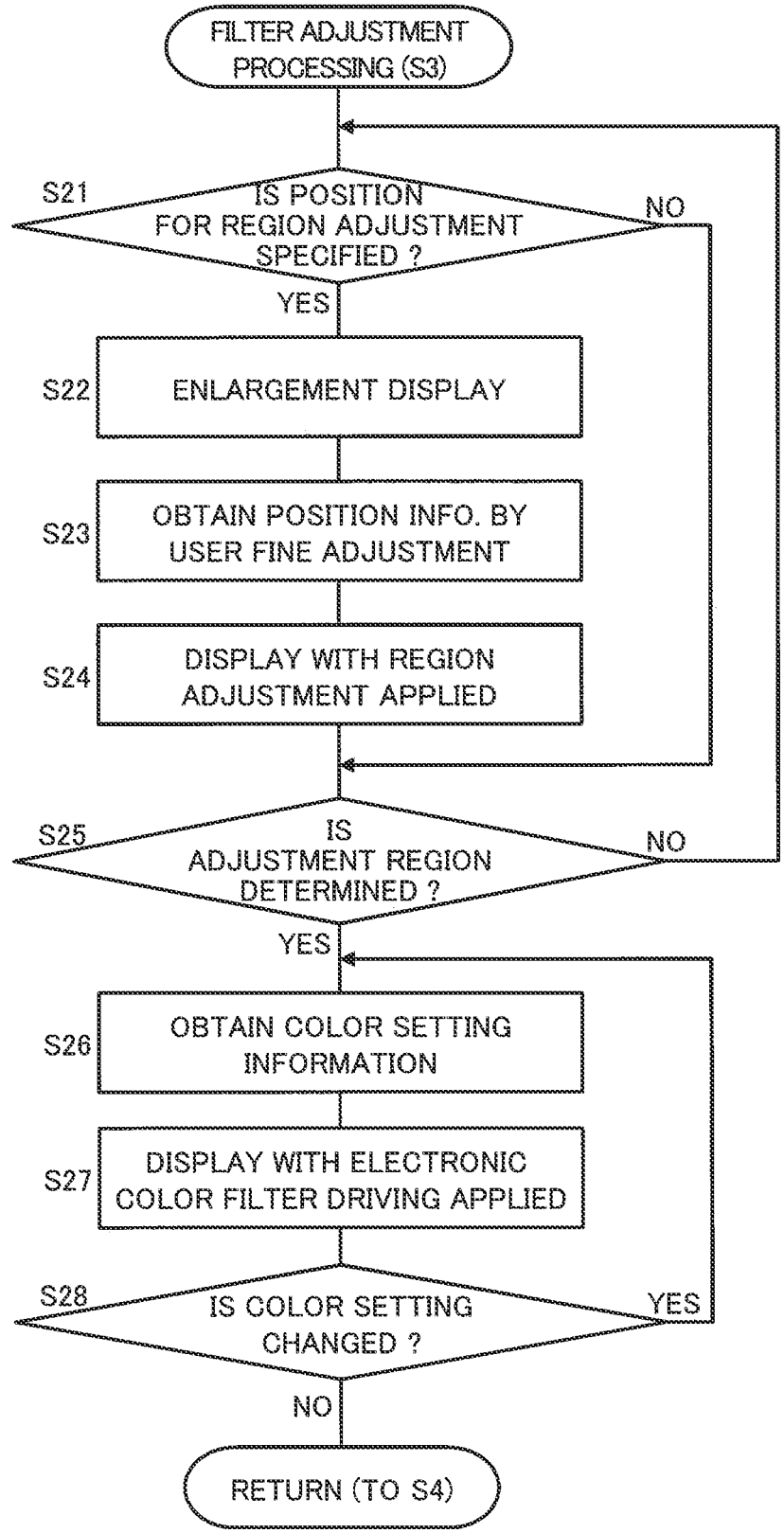
FIG. 8 is a flowchart illustrating filter adjustment processing according to the first embodiment.
Figure 9A:
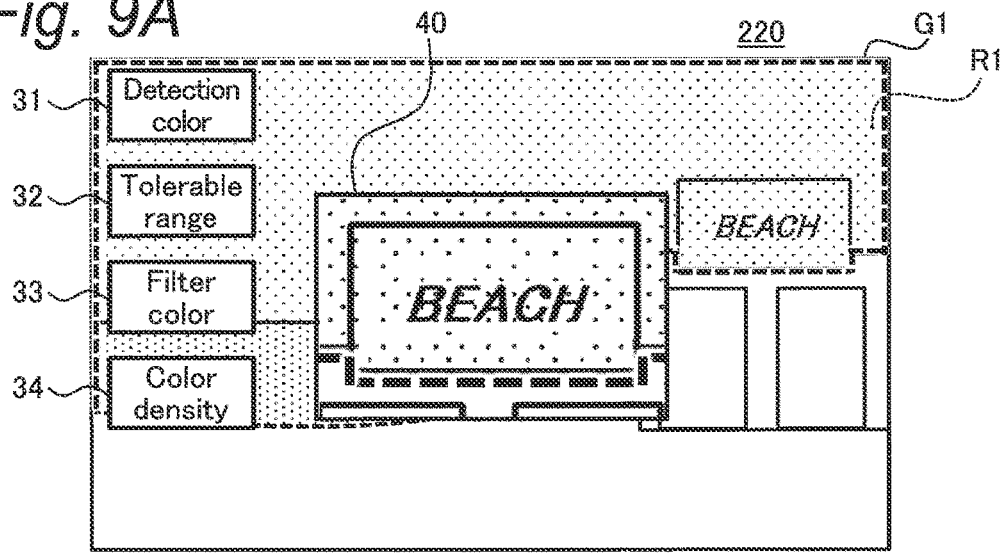
FIGS. 9A to 9C are diagrams to describe filter adjustment processing according to the first embodiment.
Figure 9B:
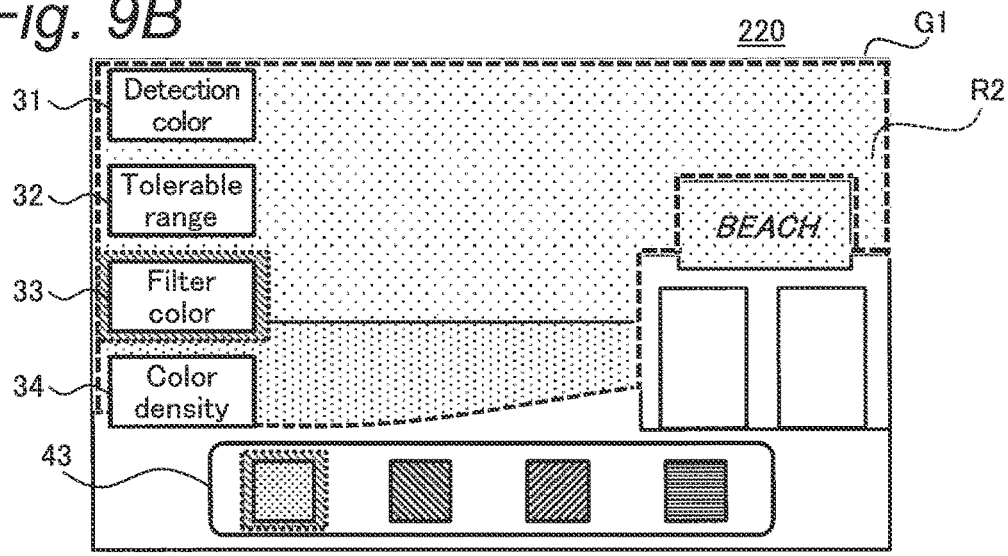
Figure 9C:
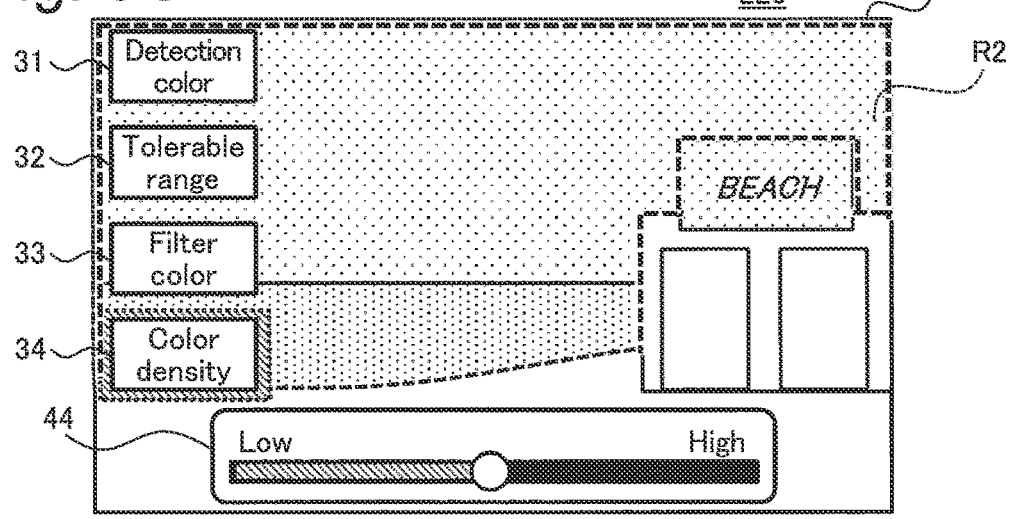

FIG. 8 is a flowchart illustrating the filter adjustment processing (S3) of the digital camera 100 according to the present embodiment. FIGS. 9A to 9C are diagrams to describe the filter adjustment processing (S3).

First, the controller 180 receives, for example, a user operation for designating a position in the vicinity of the color region R1 of the detection results of the region detection processing (S2 in FIG. 4) (S21). The position designation operation in step S21 is, for example, a touch operation on the through image G1 or a user operation for designating a position on the through image G1 using a joystick or the like, and is performed to start fine-adjustment to change the adjustment region R2 (FIG. 5C) from the color region R1 (FIG. 5B), for example.

In a case where the position designation operation is inputted (YES in S21), the controller 180 controls the display monitor 220 or the like to enlarge and display the vicinity of the designated position, for example (S22). The display example in step S22 is shown in FIG. 9A.

FIG. 9A illustrates a case where the position near the signboard is designated by the position designation operation (S21) on the display screen of FIG. 5B. With the enlarged display of step S22, the user is able to confirm the boundary or the like of the color region R1 in the vicinity of the designated position in detail in the display enlargement range 40, and can easily issue a fine-adjustment instruction.

For example, on the display screen illustrated in FIG. 9A, the controller 180 receives a user operation for instructing fine-adjustment to change from the color region R1 to the adjustment region R2, for example, and acquires position information and the like of the portion that was fine-adjusted by the user operation (S23). In step S23, the controller 180 receives a user operation for moving the boundary position of the color region R1 in the enlargement range 40 through a touch operation or the like, for example, and calculates position information for the portion changed by fine-adjustment, at position coordinates on the through image G1 corresponding to the enlargement range 40. Through this user operation, the signboard portion can be removed from the color region R1.

Next, based on the acquired position information, the controller 180 changes the adjustment region R2 from the color region R1 so as to reflect the instructed fine-adjustment, and causes the display monitor 220 to display the adjustment region R2 (S24). In step S24, the controller 180 erases the display of the enlargement range 40 and returns to the live view screen. For example, in response to the user operation of fine-adjustment on the display screen of FIG. 9A (S23), the display monitor 220 displays the display screen illustrated in FIG. 5C in step S24.

The controller 180 receives a user operation for determining the adjustment region R2 on the user interface 210, for example, during screen display as per FIG. 5C (S25). The region determination operation in step S25 is set to a predetermined user operation such as a pressing operation of a determination button, for example. The region determination operation may be an instruction to drive the electronic color filter 150.

When the region determination operation is not inputted (NO in S25), the controller 180 returns to step S21, for example. The user is able to perform fine-adjustment to the region changing until the adjustment region R2 displayed on the live view screen falls within a desired range (S21 to S25). However, when a position designation operation is not inputted especially (NO in S21), the controller 180 proceeds to step S25, for example. The user is also able to determine the color region R1 as the adjustment region R2 without particularly changing the color region R1.

In a case where a region determination operation is inputted (YES in S25), the controller 180 acquires color setting information that includes a preset filter color and color density from the flash memory 240, for example (S26). The controller 180 drives the electronic color filter 150 so as to set the filter color and the color density in the acquired color setting information to the determined adjustment region R2, and displays the live view screen of the imaging result reflecting such settings (S27).

At such time, the controller 180 receives, for example, a user operation for changing or determining the filter color or the color density (that is, the color settings) set for the adjustment region R2 being displayed, in the user interface 210 (S28). The display example in step S28 is illustrated in FIGS. 9B and 9C.

FIG. 9B illustrates a state in which a filter color icon 33 allowing inputting of an operation for changing the filter color in the example of FIG. 9A is enabled. For example, the controller 180 displays a color palette 43 that includes a plurality of candidate colors, and, through a touch operation or the like on the color palette 43, receives a change operation for selecting a filter color from the plurality of candidate colors (S28).

FIG. 9C illustrates a state in which a color density icon 34 allowing inputting of a color-density change operation is enabled in the example of FIG. 9A. For example, the controller 180 displays a setting bar 44 for the allowable range, and, through a touch operation or the like on the setting bar 44, receives a change operation for increasing or decreasing the color density pertaining to the filter color being set (S28).

Returning to FIG. 8, in a case where an operation for changing the color setting is inputted (YES in S28), the controller 180 changes the color setting of the adjustment region R2 in response to the inputted user operation and again performs the processing of step S26 and subsequent steps. The user is able to input a color-setting change operation or determination operation while checking the through image G1 reflecting the filter color and the color density after the setting change on the live view screen.

In a case where a determination operation is inputted instead of a color-setting change operation (NO in S28), the controller 180 ends the filter adjustment processing (S3) with the current state of the electronic color filter 150 serving as the adjustment result, for example, and proceeds to step S4 of FIG. 4.

With the filter adjustment processing (S3) above, the digital camera 100 is capable of easily obtaining the adjustment region R2 intended by the user by changing the adjustment region R2 in response to a user operation from the detected color region R1 (S21 to S24). Further, the digital camera 100 makes visible the state reflecting the color setting of the electronic color filter 150 and receives a color-setting change operation (S26 to S28), thereby enabling the electronic color filter 150 to be easily driven with the filter color and the color density intended by the user.

In the filter adjustment processing (S3) above, the filter color of the electronic color filter 150 may not be the same as the detection color in particular, and various colors can be applied. For example, in a case where the detection color is blue, the filter color may be set to a color tone, among blues, that is different from the detection color. Furthermore, the filter color is not limited to a color similar to the detection color, and can be set to a color desired by the user. For instance, in the example of FIG. 5, red can be used to produce a sunset sky, or a sky with a fantastical impression such as green, purple, or yellow can be produced. Various filter colors can be set, for example, by appropriately adjusting the ratios between RGB.

Further, gradation setting may be used in the filter adjustment processing (S3) as above. For example, the digital camera 100 adjusts the color density so as to continuously change between the inside and the outside of the adjustment region R2. As a result, for example, it is possible to easily perform the adjustment desired by the user such as that of enabling, with a natural impression, a change in color tone, using the electronic color filter 150, in the recorded image G2 of the shooting result. For example, the necessity of gradation may be selectable by a user operation in a setting menu or the like. Further, not only the necessity of gradation, but also details such as the range or the rate of change with which gradation is to be applied, for example, can be set by the user.

3. Summary

As described above, the digital camera 100, which is an example of the imaging apparatus according to the present embodiment, includes the image sensor 140 as an example of an image sensor, the controller 180, the card slot 190 as an example of a recorder, and the electronic color filter 150 as an example of an adjuster. The image sensor 140 captures a subject image by receiving light in a plurality of colors and generates image data. The controller 180 controls the image sensor 140. The electronic color filter 150 adjusts the light reception rate, that is, the color density at which the image sensor 140 receives light, color by color, in each position on the incident surface 50 whereon the light is incident, corresponding to the image represented by the image data. The controller 180 controls the electronic color filter 150 so as to render the color density of a specific filter color (first color) in a position corresponding to part of the image on the incident surface different from the color density of the filter color in other positions (S3), and causes the image sensor 140 to capture an image in a state where the color density of the filter color has been rendered different by the electronic color filter 150, thereby generating image data representing the image (S4).

The digital camera 100 described above enables colors of an image to be partially adjusted using the electronic color filter 150, and enables the colors in the image to be easily adjusted.

In the digital camera 100 according to the present embodiment, the controller 180 detects the color region R1 as an example of a partial region serving as a target for adjusting, using the electronic color filter 150, the color density of the filter color in the through image G1 as an example of the captured image captured by the image sensor 140 (S2). As a result, the digital camera 100 is capable of detecting an adjustment target of the electronic color filter 150 and of easily adjusting the colors of the image.

In the digital camera 100 according to the present embodiment, the controller 180 detects, as a partial region, a region, that is, the color region R1 having a detection color (second color) that is the same as or different from the filter color in the captured image (S2). Thus, the adjustment target of the electronic color filter 150 is detected by the digital camera 100 from the viewpoint of a specific color, and colors in the image can be easily adjusted.

In the present embodiment, the digital camera 100 further includes a user interface 210 that enables a user operation to be inputted with respect to an operation screen such as a live view screen for displaying the through image G1. The controller 180 causes the operation screen to display the detected partial region, and receives, in the user interface 210, a user operation for changing at least one of the partial region, the filter color, and the color density of the filter color in the partial region (see S3 and FIG. 9). Accordingly, colors in the image can be easily adjusted according to the intentions of the user.

In the present embodiment, the digital camera 100 may further include a user interface 210 that enables a user operation for setting at least one of the filter color and the color density of the filter color to be inputted (see S3 and FIG. 9). Thus, colors in the image can be easily adjusted according to the intentions of the user. For example, the digital camera 100 may have a setting menu that enables such color settings to be set in advance.

In the present embodiment, the digital camera 100 further includes a card slot 190 as an example of a recorder that records image data on a recording medium. The controller 180 causes the image sensor 140 to capture an image in a state where the color density of the filter color has been rendered different by the electronic color filter 150, and causes the card slot 190 to record image data representing the image (S4). The digital camera 100 according to the present embodiment enables colors in an image that has been shot and recorded to be easily adjusted.

Second Embodiment

A second embodiment of the present disclosure will be described hereinbelow with reference to FIGS. 10 and 11. In the first embodiment, a digital camera 100 that performs region detection based on color designation information was described. In the second embodiment, a digital camera 100 that performs region detection of a specific subject will be described.

Hereinafter, the digital camera 100 according to the first embodiment will be described by appropriately omitting descriptions of the same configurations and operations as those of the digital camera 100 according to the first embodiment.

Figure 10:
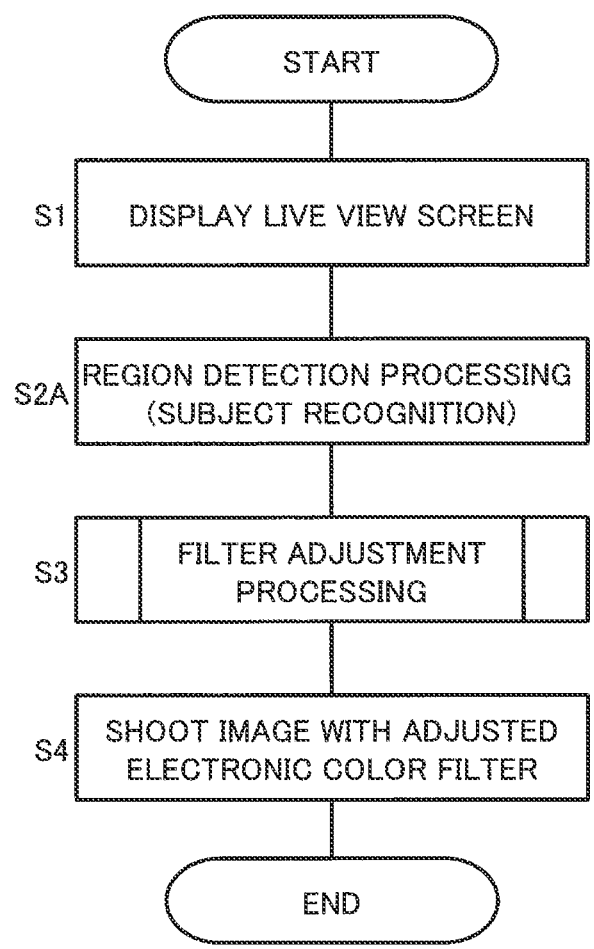
FIG. 10 is a flowchart illustrating the operation of the digital camera according to a second embodiment.

FIG. 10 is a flowchart illustrating the operation of the digital camera 100 according to the second embodiment. FIG. 11 is a diagram to illustrate the operation of the digital camera 100 according to the present embodiment.

In the digital camera 100 according to the present embodiment, when performing the whole operation in the shooting mode using the electronic color filter 150 as per the first embodiment, the controller 180 performs region detection processing based on recognition of the subject, as shown in FIG. 10, instead of step S2 in FIG. 4 (S2A). Furthermore, the controller 180 according to the present embodiment performs the processing of steps S1, S3, and S4, for example, as per the first embodiment.

In the region detection processing (S2A) according to the present embodiment, the controller 180 detects a region conforming to the shape of a portion in which the designated subject appears, that is, the subject region, in the through image G1 through, for example, machine learning of image recognition. The subject to be detected in step S2A is designated in, for example, a setting menu of the digital camera 100, or the like. FIG. 11 shows a display example of a setting menu of the digital camera 100 according to the present embodiment.

For instance, in an example as per FIGS. 5A to 5C, when the user designates a subject to be detected as the sky and the sea, in step S2A of FIG. 4, the controller 180 detects a subject region similar to the adjustment region R2 of FIG. 5C. As a result, the digital camera 100 according to the present embodiment is capable of easily performing the region detection intended by the user without including the portion having the same color as the subject desired by the user, such as the color region R1 in the example of FIG. 5B in particular.

As described above, in the digital camera 100 according to the second embodiment, the controller 180 detects, as a partial region, a region in which a predetermined subject (for example, the sky and the sea) appears in the through image G1 as an example of a captured image, that is, a subject region (S2A). Thus, the adjustment target of the electronic color filter 150 is detected by the digital camera 100 from the viewpoint of a specific subject, and colors in the image can be easily adjusted.

The digital camera 100 according to the present embodiment may repeatedly execute, at a predetermined cycle, the foregoing region detection processing (S2A) based on subject recognition. As a result, the controller 180 is capable of sequentially updating the state of the electronic color filter 150 by detecting the subject region based on the sequentially obtained through image G1 or the like and setting the adjustment region R2 so as to follow the movement of the subject, for example, during moving image shooting. In the filter adjustment processing at the time of the update, the user operation of various fine-adjustments is appropriately omitted. For example, in a case where, due to tracking using artificial intelligence (AI) technology, there is movement in the subject during moving image shooting or the like, the controller 180 may update the state of the electronic color filter 150 so as to maintain the setting that was fine-adjusted beforehand as long as there is no change in the configuration on the image in which the subject appears.

Figure 11:
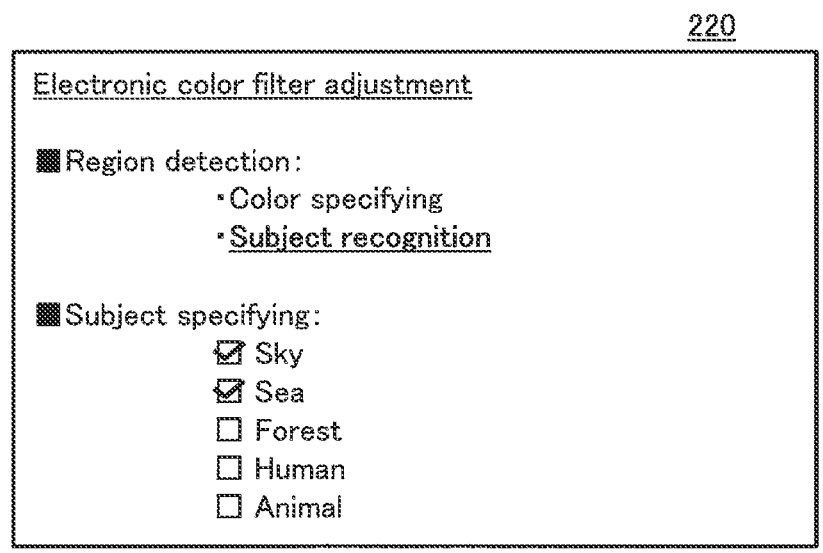
FIG. 11 is a diagram to describe the operation of the digital camera according to the second embodiment.

In the setting menu illustrated in FIG. 11, options for subjects to be detected by the digital camera 100 are displayed. The subject to be detected is not particularly limited to the above, and can be set to various subjects. For example, the subject to be detected may be any one of the sky and the sea, or may be various subjects such as a mountain forest, a building, a person, and an animal. Furthermore, the region designation processing executed by the digital camera 100 may be changeable by a user operation such as a setting menu, for example, as shown in FIG. 11.

Other Embodiments

As described above, the first and second embodiments have been described to illustrate the technology disclosed in the present application. However, the technology of the present disclosure is not limited thereto, and can also be applied to embodiments in which changes, substitutions, additions, omissions, and the like are made as appropriate. Moreover, it is also possible to combine each of the constituent elements described in the above embodiments to form a new embodiment.

In the first and second embodiments, an example in which the color density in one adjustment region R2 is adjusted in the electronic color filter 150 has been described, but a plurality of adjustment regions may be adjusted. Such a modification will be described using FIG. 12.

Figure 12:
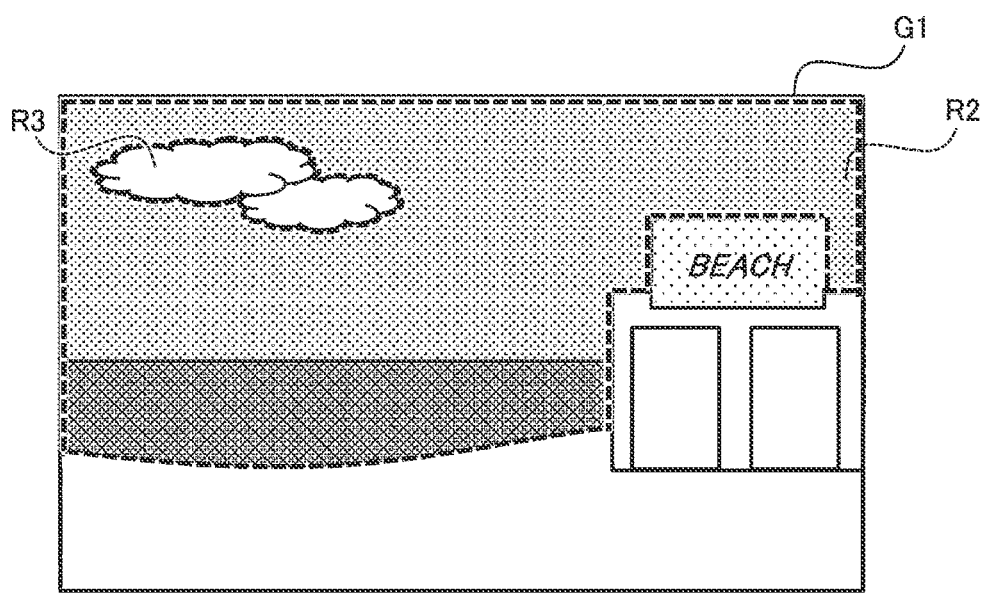
FIG. 12 is a diagram to describe a modification of the operation of the digital camera.

FIG. 12 is a diagram to describe a modification of the operation of the digital camera 100. In the example of FIG. 12, the digital camera 100 adopts mutually different color settings in the plurality of adjustment regions R2 and R3. For example, the controller 180 of the digital camera 100 performs filter adjustment processing (S3) as per the first and second embodiments, for each of the adjustment regions R2 and R3. Further, color-designation or subject-recognition region detection processing (S2, S2A) may be performed for each of the adjustment regions R2 and R3.

Furthermore, in the digital camera 100 according to the present embodiment, a color density that uses a chromatic color and an achromatic color as filter colors may be set. For instance, in the example of FIG. 12, the digital camera 100 sets the color density of a chromatic color in the adjustment region R2, and sets the color density of an achromatic color region R3 (that is, the light reception rate of white light) in the adjustment region R3. As a result, for example, it is possible to realize image shooting in which blown-out highlights of the adjustment region R3 are suppressed while rendering vivid the color of the adjustment region R2.

In the second embodiment above, an example was described in which region detection processing (S2A) based on subject recognition can be repeatedly executed during moving image shooting, but color-designation region detection processing (S2) as per the first embodiment may also be repeatedly executed. In this case, the color designation information may be appropriately adjusted to match the color region R1 of the detection target before and after the adjustment of the electronic color filter 150. For example, the controller 180 of the digital camera 100 may update the detection color according to the position of the detection color marker 41 at an appropriate time, or may adjust the allowable range to include the detection color before and after the adjustment.

In the above first embodiment, an electronic color filter 150, which is capable of adjusting the transmittance in pixel units was described. In the present embodiment, the electronic color filter 150 may not be adjustable in pixel units, and the color density may be adjustable in units of rows or columns, or various block units, for example. For the electronic color filter 150, a configuration such as a drive circuit capable of setting the color density for each of various units can be adopted.

Further, in each of the above embodiments, the configuration example of the electronic color filter 150 as an example of the adjuster was described, but the present disclosure is not particularly limited thereto. For example, in each of the above embodiments, an electronic color filter 150 configured to be integral with the image sensor 140 has been described, but the electronic color filter 150 according to the present embodiment may be configured to be separate from the image sensor 140. For example, the electronic color filter 150 may be disposed between the image sensor 140 and the optical system 110, or may be provided on the optical system 110 side. The electronic color filter 150 is appropriately aligned such that various positions on the imaging surface of the image sensor 140 correspond to positions on the incident surface whereon the light is incident in the electronic color filter 150.

Furthermore, the adjuster according to the present embodiment may be configured by applying a technology for adjusting, as the light reception rate, sensitivity such as the quantum efficiency in the photoelectric conversion of each pixel in the image sensor 140 (for example, JP 2019-68402). Specifically, the adjuster according to the present embodiment may be configured to realize adjustment of the light reception rate for each region by changing, using an applied voltage or the like, the RGB gain corresponding to a desired filter color, in the process until the light reception result by each RGB light-receiving unit in the image sensor 140 is converted into an electric signal. Alternatively, the adjuster according to the present embodiment can also be realized by a configuration in which a period during which each light-receiving unit acquires charge (that is, an electronic shutter speed) is changed in the conversion process into an electric signal by each RGB light-receiving unit in the image sensor 140.

Furthermore, in each of the above embodiments, the card slot 190 is illustrated as the recorder of the digital camera 100, but the recorder is not limited thereto. In the present embodiment, the recording medium which is the recording destination for recording by the recorder is not limited to the memory card 200, and may be, for example, an external storage device such as an SSD drive. In the present embodiment, the recorder may be various interface circuits that write data from the digital camera 100 to the external storage device, or may be various communication modules that perform data transmission according to various communication standards. Such communication modules serving as the recorder may record data from the digital camera 100 to various media for external distribution.

Further, in each of the above embodiments, the display monitor 220 is illustrated as an example of the display unit. In the digital camera 100 according to the present embodiment, the display unit is not limited to the display monitor 220, and may be, for example, an electronic view finder (EVF), an output module that outputs a video signal according to the HDMI (registered trademark) standard, or the like.

Further, in each of the above embodiments, a digital camera 100 that includes the optical system 110 and the lens driver 120 is illustrated. The imaging apparatus according to the present embodiment does not need to include the optical system 110 or the lens driver 120, and may be, for example, an interchangeable lens-type camera. In the case of an interchangeable-lens type, the electronic color filter 150 need not be provided in the body of the camera serving as the imaging apparatus. In this case, the adjuster of the imaging apparatus may have various circuit configurations such as an interface circuit that controls the electronic color filter 150 provided on the interchangeable lens side, or may be realized in cooperation with the controller 180.

Further, in each of the above embodiments, a digital camera is described as an example of the imaging apparatus, but the present disclosure is not limited thereto. The imaging apparatus of the present disclosure need only be an electronic device having an image shooting function (for example, a video camera, a smartphone, a tablet terminal, or the like).

As described above, the embodiments have been described to illustrate the technology of the present disclosure. To that end, the accompanying drawings and the detailed description are provided. Therefore, among the constituent elements disclosed in the accompanying drawings and the detailed description, not only the constituent elements which are essential for solving the problem but also the constituent elements which are non-essential in solving the problem may be included in order to illustrate the above technology.

SUMMARY OF ASPECTS

Various aspects according to the present disclosure are listed hereinbelow.

A first aspect according to the present disclosure includes an image sensor that captures a subject image by receiving light of a plurality of colors and that generates image data; a controller that controls the image sensor; and an adjuster that adjusts a light reception rate at which the image sensor receives the light, color by color, in each position on an incident surface whereon the light is incident, in response to an image represented by the image data. The controller controls the adjuster so as to render the light reception rate of a specific first color in a position corresponding to part of the image on the incident surface different from the light reception rate of the first color in other positions, and causes the image sensor to capture an image in a state where the light reception rate of the first color has been rendered different by the adjuster, thus generating image data representing the image.

A second aspect of the present disclosure is the imaging apparatus according to the first aspect, wherein the controller detects a partial region serving as a target for adjusting, using the adjuster, the light reception rate of the first color in the captured image captured by the image sensor.

A third aspect of the present disclosure is the imaging apparatus according to the first or second aspect, wherein the controller detects, as the partial region, a region having a second color that is the same as or different from the first color in the captured image.

A fourth aspect of the present disclosure is the imaging apparatus according to any of the first to third aspects, wherein the controller detects, as the partial region, a region in the captured image where a predetermined subject appears.

A fifth aspect of the present disclosure is the imaging apparatus according to any of the first to fourth aspects, further including a user interface that enables a user operation to be inputted with respect to an operation screen for displaying the captured image. The controller causes the operation screen to display the detected partial region, and receives, in the user interface, a user operation for changing at least one of the partial region, the first color, and the light reception rate of the first color in the partial region.

A sixth aspect of the present disclosure is the imaging apparatus according to any of the first to fifth aspects, further including a user interface that enables a user operation for setting at least one of the first color and the light reception rate of the first color.

A seventh aspect of the present disclosure is the imaging apparatus according to any of the first to sixth aspects, further including a recorder that records the image data on a recording medium. The controller causes the image sensor to capture an image in a state where the light reception rate of the first color has been rendered different by the adjuster, and causes the recorder to record image data representing the image.

The concept of the present disclosure can be applied to electronic devices (an imaging apparatus such as a digital camera, a camcorder, or a box camera, or a mobile phone, a smartphone, or the like) that have an imaging function.

The invention claimed is:

1. An imaging apparatus, comprising:
    an image sensor that captures a subject image by receiving light of a plurality of colors, to generate image data;
    a controller that controls the image sensor; and
    an adjuster that adjusts a light reception rate, in each position on an incident surface, the light reception rate allowing the image sensor to receive the light color by color, the incident surface being entered by the light corresponding to an image represented by the image data,
    wherein the controller
    detects a partial region in a captured image by the image sensor, based on a first color specified by a user selection, the partial region serving as a target for adjusting the light reception rate of the first color by the adjuster,
    causes the adjuster to control the light reception rate to be different between a corresponding position and other positions in the incident surface, the corresponding position corresponding to the partial region in the incident surface and
    causes the image sensor to capture the image with the light reception rate of the first color being controlled by the adjuster, thus generating the image data indicating the image.

2. The imaging apparatus according to claim 1, wherein the controller detects, as the partial region, a region having a second color that is the same as or different from the first color in the captured image.

3. The imaging apparatus according to claim 1, wherein the controller detects, as the partial region, a region in the captured image where a predetermined subject appears.

4. The imaging apparatus according to claim 1, further comprising:
    a user interface that is capable of inputting a user operation with respect to an operation screen for displaying the captured image,
    wherein the controller causes the operation screen to display the detected partial region, and enables the user interface to input the user operation for changing at least one of the partial region, the first color, or the light reception rate of the first color in the partial region.

5. The imaging apparatus according to claim 1, further comprising:
    a user interface that is capable of inputting a user operation for setting at least one of the first color or the light reception rate of the first color.

6. The imaging apparatus according to claim 1, further comprising:
    a recorder that records the image data on a recording medium,
    wherein the controller causes the image sensor to capture an image with the light reception rate of the first color being rendered different by the adjuster, and causes the recorder to record image data representing the image.

7. The imaging apparatus according to claim 1, further comprising:
    a user interface that is capable of inputting a user operation with respect to an operation screen for displaying the captured image,
    wherein the controller causes the operation screen to display the detected partial region, to receive the user operation to change the partial region via the user interface.

* * * * *